United States Patent [19]
Halstead

[11] Patent Number: 5,186,248
[45] Date of Patent: Feb. 16, 1993

[54] EXTRUDED TANK CONDENSER WITH INTEGRAL MANIFOLD

[75] Inventor: Gary A. Halstead, Lockport, N.Y.

[73] Assignee: General Motors Corporation, Detroit, Mich.

[21] Appl. No.: 856,271

[22] Filed: Mar. 23, 1992

[51] Int. Cl.$^5$ .................. F28F 9/02; F28D 1/053
[52] U.S. Cl. .................. 165/173; 165/153; 165/174; 165/175; 165/176
[58] Field of Search .............. 165/174, 175, 176, 173, 165/150, 153

[56] References Cited

U.S. PATENT DOCUMENTS

| | | | |
|---|---|---|---|
| 740,207 | 9/1903 | White | 165/176 |
| 1,441,034 | 1/1923 | Schulz | 165/173 |
| 2,357,156 | 8/1944 | Wilson | 165/176 |
| 2,650,799 | 9/1953 | Fritzberg | 165/174 |
| 3,067,818 | 12/1962 | Ware et al. | 165/174 |
| 3,265,126 | 8/1966 | Donaldson | 165/140 |
| 4,960,169 | 10/1990 | Granetzke | 165/173 |
| 5,062,476 | 11/1991 | Ryan et al. | 165/173 |
| 5,067,561 | 11/1991 | Joshi et al. | 165/174 |
| 5,101,890 | 4/1992 | Aoki et al. | 165/175 |

FOREIGN PATENT DOCUMENTS

| | | | |
|---|---|---|---|
| 42026 | 3/1930 | Denmark | 165/174 |
| 343713 | 10/1904 | France | 165/150 |
| 63-3192 | 1/1988 | Japan . | |
| 131194 | 1/1929 | Switzerland | 165/174 |
| 796437 | 6/1958 | United Kingdom | 165/174 |

Primary Examiner—John Rivell
Assistant Examiner—L. R. Leo
Attorney, Agent, or Firm—Ronald L. Phillips

[57] ABSTRACT

A heat exchanger apparatus includes first and second parallel tank units with a core of parallel tube passes and air centers extending therebetween for cooling the fluid in the tanks and flowing through the tube passes. The first tank unit includes an integral main tank and outlet tank. The main tank is connected to an inlet fitting for receiving refrigerant vapor and is in fluid communication with the tube passes. The outlet tank is parallel with the main tank and spaced from the tube passes and includes the outlet fitting for directing the high pressure refrigerant liquid to the evaporator of a refrigerant system in an automotive air conditioning system and an aperture between the main tank and outlet tank supplies refrigerant from the core to the outlet tank.

1 Claim, 3 Drawing Sheets

EXTRUDED TANK CONDENSER WITH INTEGRAL MANIFOLD

TECHNICAL FIELD

The invention relates to a heat exchanger apparatus for cooling refrigerant in an automobile air conditioning system and more particularly to a condenser apparatus having parallel tube passes of the type including air centers for directing the inlet air stream of the vehicle through separate tube passes in the condenser apparatus.

BACKGROUND ART

Heat condensers are commonly known for use in vehicles for cooling high pressure refrigerant vapor. Such heat exchangers include parallel tanks with a plurality of tube passes extending between each tank for communicating the refrigerant flow therebetween. Air centers are connected to and between each tube pass for conductively transferring heat from the refrigerant to the air flow therethrough.

The common practice for plumbing refrigerant into and out of condensers is with tubing, typically 0.5 inches and 0.375 inches. Some packaging of the vehicle requires severe and complicated bends in the pipes to and from the condensers. In the case of three-pass and five-pass heat exchangers, the inlet and outlet are at opposite sides or tanks of the condenser. Pipes with costly brackets and complicated bends have been the traditional method to arrange both fittings on the same side of the condenser for connection to the refrigerant lines of the refrigerant system of an automotive air conditioning system.

Prior art four-pass or two-pass parallel flow condensers are also known. FIG. 1A shows a four-pass condenser having an inlet pipe 1 that receives refrigerant and circulates it through brazed tube and air center core 8. In such condensers, internal separators or blockage plates 9 channel the flow through the return tank 4 and out of the inlet/outlet tank 3 and outlet pipe 2. Refrigerant flows through the tube passes and air centers brazed to the tubes conduct heat into the air stream passing through the core. Side plates 5 are brazed to the outside air centers to provide strength and to protect the outside air centers. In this configuration, an aperture is provided on the tank 3 to receive the inlet of refrigerant, and an outlet is provided on the opposite end of the tank 3. Tubing 2 is used to provide an outlet connection near the inlet.

U.S. Pat. No. 4,960,169, issued Oct. 2, 1990 in the name of Granetzke discloses a heat exchanger having partitions therein and the general structure of tank and header system. Japanese Patent Number 63-3192 discloses a heat exchanger utilizing a pair of headers and tubes providing passage shielding plates within the headers and gradually circulating a coolant through the front passage and rear side passage. The inlet side of the heat exchanger is in the opposite tank to the outlet and does not solve the problem of connecting the fittings on the same side of the heat exchanger without use of a tube extension part.

SUMMARY OF THE INVENTION

The invention relates to a heat exchanger apparatus for a motor vehicle having a plurality of parallel tube passes for cooling fluid and having air centers bonded thereto for cooling the fluid flowing through the parallel tube passes. The heat exchanger apparatus comprises first and second tank units providing a fluid space for communicating fluid therethrough. A plurality of parallel tube passes are each connected between and in fluid communication with the first and second tank units. Air centers are connected to each of the tube passes for conductively transferring heat from the fluid within the tube passes. The first tank unit includes a main tank connected with the tube passes and having a tank inlet for receiving refrigerant and an internal outlet for recirculating the refrigerant to an evaporator. An outlet tank is integrally extruded with the main tank and extends along the main tank.

The advantages of the invention include a simplified heat exchanger providing both the inlet and outlet on the same side of the heat exchanger without complicated tubing or fittings.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a prior art condenser;

DETAILED DESCRIPTION OF THE PREFERRED EMBODIMENT

Figure 1:
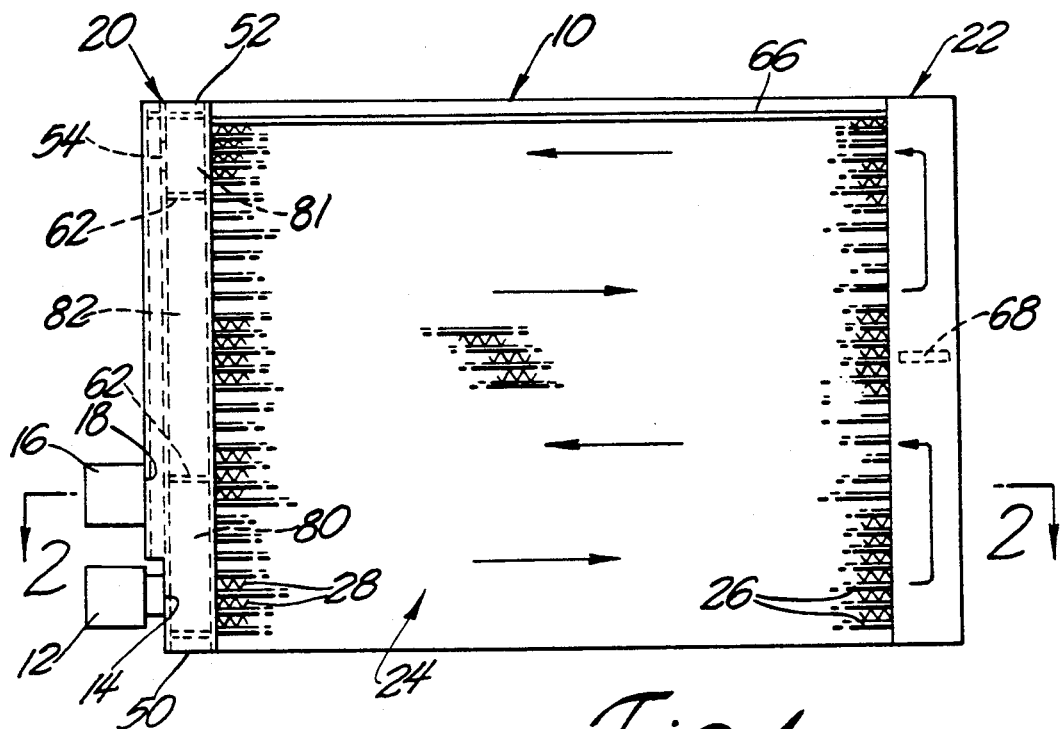
FIG. 1 is a front elevational view of a heat exchanger of a first embodiment of the subject invention.
Figure 4:
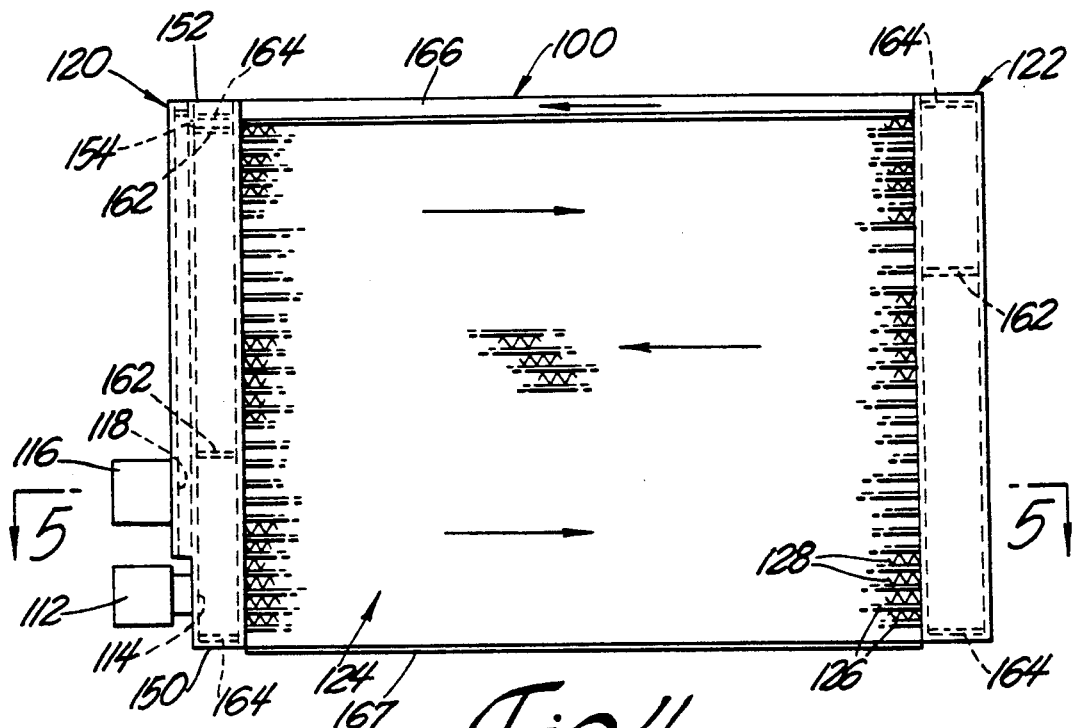
FIG. 4 is a front elevational view of a heat exchanger of a second embodiment of the subject invention.

A heat exchanger apparatus of the present invention is generally shown at 10, 100 in FIGS. 1 and 4. As commonly known in the art, such heat exchangers 10, 100 may be typically condensers which are installed in the refrigerant system of an automobile air conditioning system. A refrigerant compressor driven by the engine directs high pressure refrigerant vapor through a hose which connects to an inlet fitting 12, 112 on a tank inlet 14, 114 of the exchanger 10, 100. An outlet hose connects to an outlet fitting 16, 116 on a tank outlet 18, 118 of the exchanger 10, 100 for directing high pressure refrigerant liquid to an evaporator for cooling air flow into a passenger compartment of the vehicle. The heat exchanger apparatus 10, 100 includes first 20, 120 and second 22, 122 tank units, with the tank inlet 14, 114 and tank outlet 18, 118 on the first 20, 120 tank unit. A core 24, 124 is provided between the tanks 20, 120, 22, 122. The core 24, 124 has a frontal flow area for unrestricted flow of the air intake stream of the vehicle through the core.

A plurality of parallel tube passes 26, 126 are connected between and in fluid communication with the first 20, 120 and second 22, 122 tank units. The tube passes 26, 126 communicate the coolant between the tanks 20, 120, 22, 122 for allowing cooling of the refrigerant by the external air. The heat exchanger 10 includes air centers 28, 128 for preventing flow disturbance in the air intake stream of the vehicle across parallel tube passes 26, 126 and air centers 28, 128 therein.

The air centers 28, 128 are connected to and between each tube pass 26, 126 for conductively transferring heat from the refrigerant within the tube passes to the air centers 28, 128 which are convectively cooled by air flow thereacross.

The first tank unit 20, 120 comprises a unitary extrusion 30, 130 for forming a main tank 32, 132 and an outlet tank 34, 134. A separate header 36, 136 is connected to the extrusion 30, 130 to form the main tank 32, 132. The second tank unit 22, 122 comprises a similar unitary extrusion 38, 138 and header 40, 140, except that a single return tank 42, 142 is formed therein. The headers 36, 136, 40, 140 extend through the vertical height or longitudinal length of the first 20, 120 and second 22, 122 tanks. The headers 36, 136, 40, 140 have a plurality of spaced slots 44, 144 therein to receive the tube passes 26, 126. The slots 44 receive end extensions 46, 146 of tubes forming the tube passes 26, 126 between the first 20, 120 and second 22, 122 tanks.

The first tank unit 20, 120 includes the tank inlet 14, 114 for receiving the refrigerant from the compressor and the tank outlet 18, 118 for supplying the refrigerant to the evaporator. The main tank 32, 132 is in fluid communication with the tube passes 26, 126 and the tank inlet 14, 114. The first tank 20, 120 has first 50, 150 and second 52, 152 ends longitudinally spaced along the tank 20, 120. The tank inlet 14 is at the first end 50, 150. The main tank 32, 132 includes an internal outlet 54, 154 at the second end 52, 152. The outlet tank is an integral extrusion cavity 34, 134 that extends parallel and integral with the main tank 32, 132 which is an integral extrusion cavity. The outlet tank 34, 134 is spaced from the header 36, 136 and tube passes 26, 126 for receiving fluid from the main tank 32, 132 at the integral outlet 54, 154. Outlet tank 34, 134 supplies the fluid to the tank outlet 18, 118 that is connected through an aperture 61 in an integral tank wall 58 at a point closely adjacent inlet fitting 12.

The main tank 32, 132 and the outlet tank 34, 134 are comprised of a unitary extrusion having a pair of longitudinal parallel side walls 56, 156 with first 58, 158 and second 60, 160 longitudinal tank walls integrally formed therebetween. The first longitudinal wall 58, 158 has an aperture 61 thereon forming the tank outlet 18, 118. The second longitudinal wall 60, 160 has an aperture at the second end 52, 152 thereof forming the internal outlet 54, 154 and a second aperture 66 at the first end 50, 150 forming the tank inlet 14, 114. The header 36, 136 extends between the side walls 56, 156 forming the main tank 32, 132 with the second longitudinal wall 60, 160. The outlet tank 34, 134 is formed between the first 58, 158 and second 60, 160 longitudinal walls with the side walls 56, 156. The outlet tank 34, 134 extends longitudinally along the main tank 32, 132 for a length less than the main tank 32, 132 to provide clearance for the inlet fitting 12, 112 extending from the main tank 32, 132, while allowing the outlet fitting 16, 116 to be adjacent or near the inlet fitting 12, 112. The subject heat exchanger 10 allows the tank inlet 14, 114 and tank outlet 18, 118 to be located closely adjacent one another and on the same side of the heat exchanger 10, 100. The configuration provides for a compact packaging with the elimination of pipe extensions and brackets.

The second tank unit 22, 122 is extruded in the same manner as the main tank 32, 132 in the first tank unit 22, 122. There are no apertures for the inlets and outlets. Fluid communication therewith is provided through the fluid passes 26, 126.

The first 20, 120 and second 22, 122 tank units preferably include partitions 62, 162 therein longitudinally dividing the tanks, and end caps 64, 164 for enclosing the upper and lower ends of tanks 20, 120, 22, 122. The partitions 62, 162 and end caps 64, 164 are brazed to seal the fluid therein. Side plates 66, interconnect the tanks 22, 122, 24, 124 to protect and provide rigidity to the core 24, 124. The side plates 66, 166 may be mechanically connected and brazed, as commonly known in the art.

The side walls 56, 156 extend the length of the tanks 32, 132, 34, 134 with the first and second longitudinal walls 58, 158, 60, 160 integrally formed therebetween as the tanks are extruded. The side walls 56, 156 include integral tube stops 74, 174 which are aligned with the slots 44, 144 on the header 36, 136. The end extensions 46, 146 engage the tube stops 74, 174 to locate the end extensions in spaced relationship to the second longitudinal wall 60, 160 so as to define a gap therebetween for a smooth flow of fluid from the ports of the tubes 26, 126 within the tank 20, 120. The side walls 56, 156 also include longitudinal extending slots 76, 176 extending through the length of the tanks 20, 120, 22, 122 for receiving the ends of the headers 36, 136, 40, 140 for sliding engagement therewith for subsequent brazing to seal same.

The heat exchanger apparatus 10, 100 may be formed by either of two embodiments depending on the number of passes of the fluid through the core 24, 124. The first embodiment of the heat exchanger apparatus 10 is utilized when there are an even number of passes, i.e., four passes, and the second embodiment of the heat exchanger 100 is utilized where there is an odd number of passes, i.e., three or five.

Figure 2:
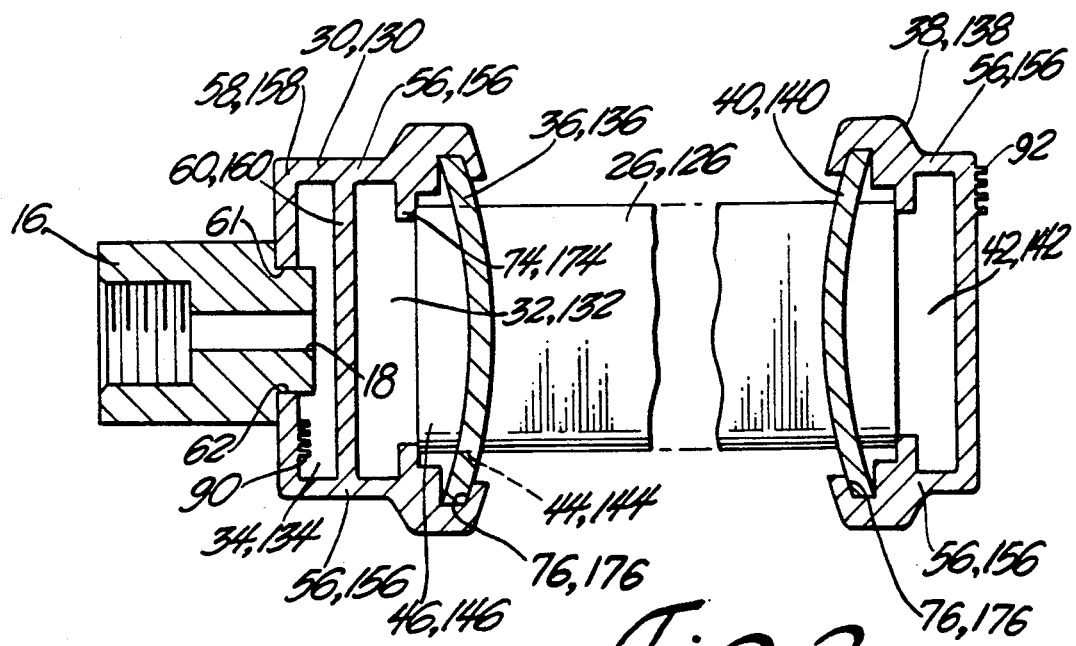
FIG. 2 is an enlarged fragmentary sectional view taken along lines 2—2 of FIG. 1 and FIG. 4.
Figure 3:
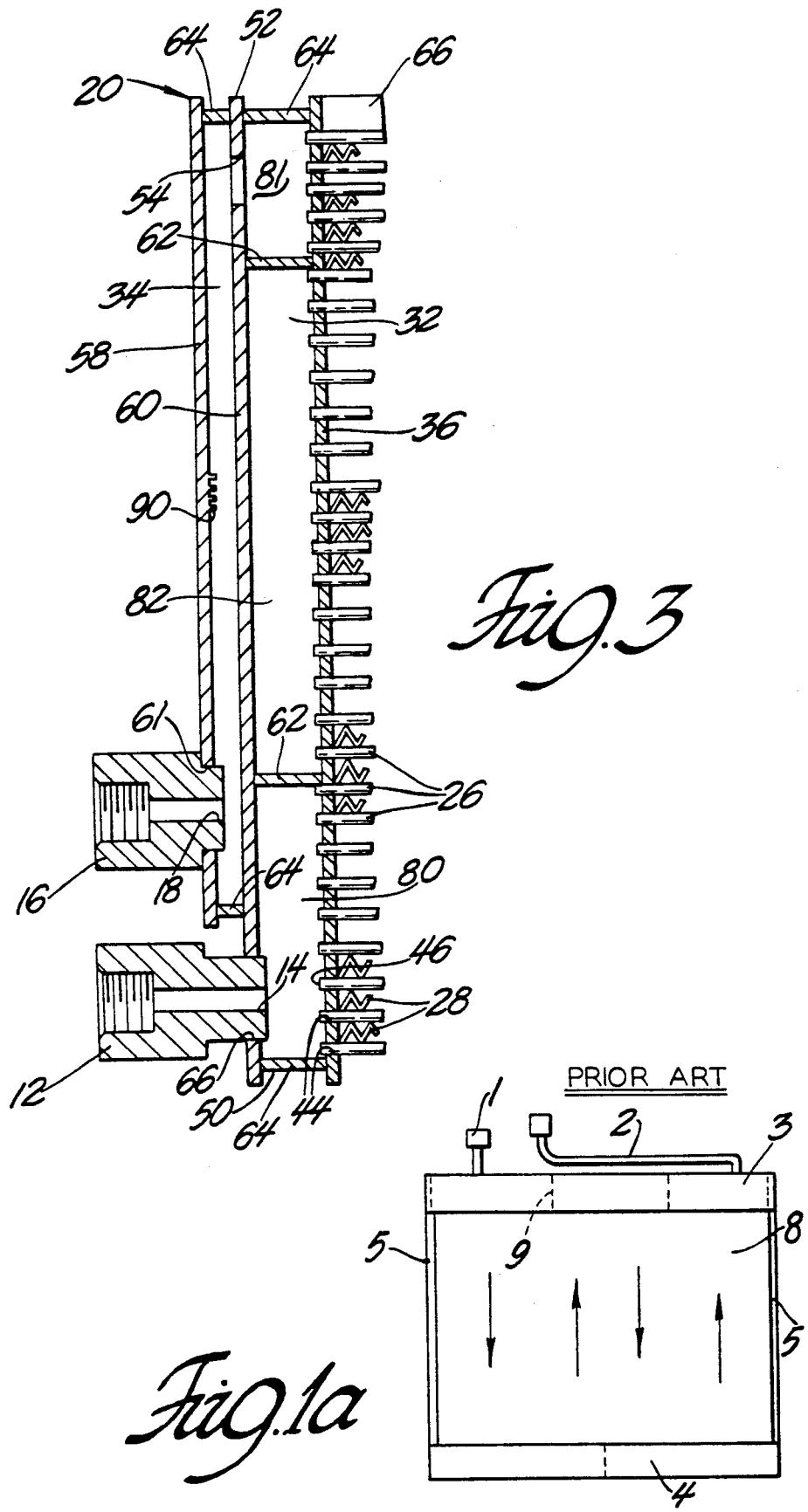
FIG. 3 is an enlarged cross sectional view of the tank units of FIG. 1.

With regard to the first embodiment 10, FIGS. 1–3 illustrate the heat exchanger apparatus. As shown, the heat exchanger apparatus 10 is a four-pass parallel flow condenser. However, it is to be understood that any number of passes may be accomplished therein. The first tank unit 20 includes two partitions 62 dividing the main tank 32 into one-quarter portions 80, 81 at the first or inlet pass and at the outlet pass, and a one half portion 82 in the center. Therefore, a chamber of the main tank 32 feeds the internal outlet 54 to the outlet tank 34. End caps 64 are brazed in the outlet tank for closing opposite ends thereof.

The second tank unit 22 is divided in equal halves by a single partition 68. As can be seen by the arrows in FIG. 1, this configuration will direct the flow of fluid into four-passes through the core 24. The internal outlet 54 of the main tank 32 is placed at the second end 52 of the tank 20 to allow flow from the last pass of tube passes 26 into the outlet tank 34. The tank inlet 14 and tank outlet 18 are preferably placed adjacent one another for ease of connection in the refrigerant system.

Figure 5:
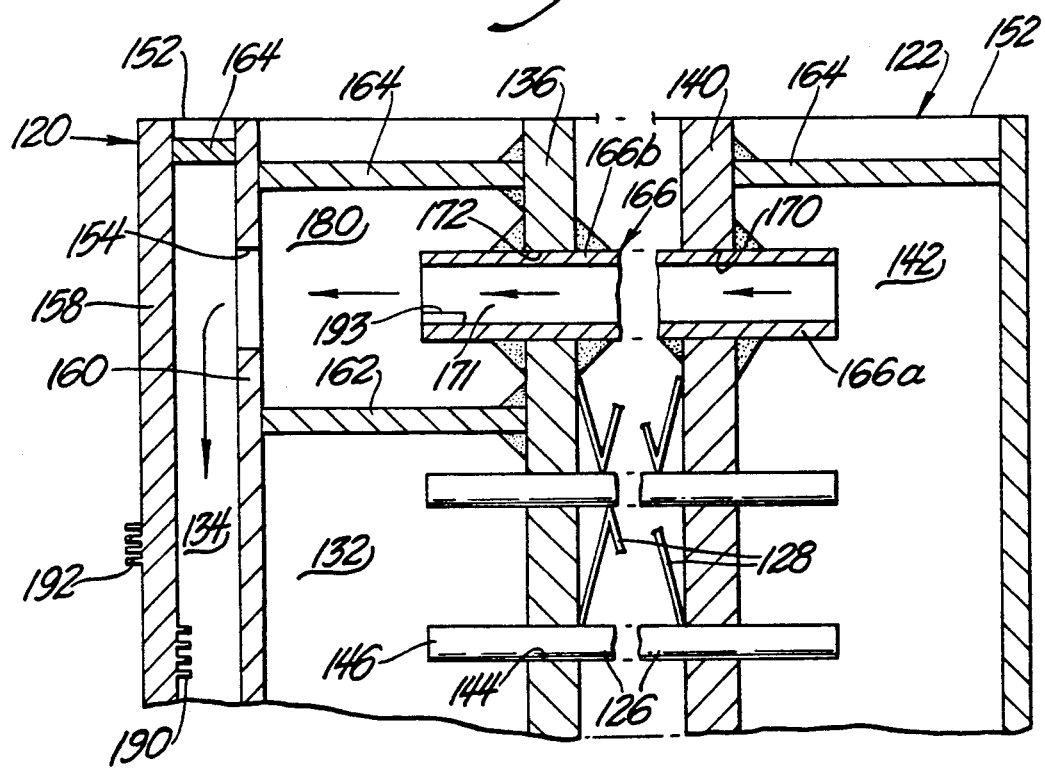
FIG. 5 is an enlarged fragmentary cross sectional view of the tank units of FIG. 4.

The second embodiment of the heat exchanger 100 is illustrated in FIGS. 2, and 4–5. The second embodiment is utilized for an odd number of passes, such as three, wherein the prior art fluid outlet is on the second tank unit. As described above, the structure of the first embodiment 10 is utilized in the second embodiment 100, except where noted below. The second tank unit 122 in the second embodiment, includes an aperture 170 in the header 140. The aperture 170 is larger than the slots 144 and is located near the second end 152 to receive a hollow cross-flow member 166 which includes an inner wall 166a brazed to the outside air center 128 and an outer wall 166b forming an outer side plate of the heat exchanger. The outer side plate 167 is a single plate member. The hollow cross-flow member 166 provides a fluid passage 171 therethrough. The hollow cross-flow member 166 is received in an aperture 172 of the header 136 of the main tank 132 to feed the fluid into the aperture 154 and into the outlet tank 134. In this embodiment 100, the main tank 132 includes two partitions 162, one adjacent the aperture 172 to provide a chamber 180 receiving the fluid from the hollow cross-flow member 166 and to feed same to the outlet tank 134, and the second partition 162 centered in the remainder of the main tank 132. The second tank unit 122 includes a single partition 162 at a location two-thirds from the second end 152 to provide return to the second pass and to the cross-flow member 166.

The designs of the subject invention provide for the location of the inlets 12, 112 and outlets 16, 116 on the same side of the heat exchanger apparatus 10, 110. This provides more compact packaging, elimination of costly pipes and brackets. The tanks 20, 120, 22, 122 may be made as standard extrusions and the partitions 62, 162 may be placed longitudinally along the length of the internal cavities of the extrusions and brazed thereto to produce the necessary configuration of passes between the tanks 20, 120, 22, 122.

As an alternative, the apparatus 10 may include internal fins 90, 190 and external fins 92, 192 extruded to the inside and outside of the outlet tank 34, 134 to enhance heat transfer. The fins 90, 190, 92, 192 are in the form of thin flanges or webs integrally formed with the walls of the extrusion and extending therefrom. Additionally, internal fins 193 may be provided inside the cross-flow member 166 to enhance performance.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. In a heat exchanger apparatus of the type having a first tank unit on one side, a second tank unit on the other side, and a plurality of parallel tube passes for communicating cooling fluid between said tank units, the improvement comprising, said first tank unit including a header that establishes the length of said first tank unit as measured between first and second ends of said first tank unit, and which receives said parallel tube passes, a first longitudinal tank wall parallel to and spaced from said header and extending less than the length of said header, a second longitudinal tank wall of a length substantially equal to said header and extending parallel between said header and first tank wall, thereby forming, in combination with said header, a main tank portion and also forming, with said first tank wall, an outlet tank portion, said second tank wall further including an internal outlet near said second end from said main tank portion to said outlet tank portion, an outlet fitting on said first tank wall near said first end, opening to said outlet tank portion, and, an inlet fitting on said second tank wall located below said outlet fitting in a clearance provided by said first tank wall having a shorter length than said second tank wall, whereby said outlet and inlet fittings are located on the same side of said heat exchanger apparatus near the first end of said first tank unit, thereby providing a simple and compact arrangement.

* * * * *